United States Patent
Okabe et al.

(10) Patent No.: US 9,789,365 B2
(45) Date of Patent: Oct. 17, 2017

(54) GOLF BALL

(71) Applicant: DUNLOP SPORTS CO., LTD., Kobe-shi, Hyogo (JP)

(72) Inventors: Satoko Okabe, Kobe (JP); Masatoshi Yokota, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 98 days.

(21) Appl. No.: 14/841,017

(22) Filed: Aug. 31, 2015

(65) Prior Publication Data

US 2016/0059082 A1    Mar. 3, 2016

(30) Foreign Application Priority Data

Sep. 1, 2014 (JP) ................................. 2014-177081

(51) Int. Cl.
  *A63B 37/00* (2006.01)
  *C08F 16/38* (2006.01)

(52) U.S. Cl.
  CPC ...... *A63B 37/0039* (2013.01); *A63B 37/0045* (2013.01); *A63B 37/0075* (2013.01); *C08F 16/38* (2013.01)

(58) Field of Classification Search
  CPC ...... C09D 129/14; C08F 16/38; C08F 216/38; C08L 29/14
  See application file for complete search history.

(56) References Cited

U.S. PATENT DOCUMENTS

| 2,318,547 A * | 5/1943 | Welch ................ A63B 37/0003 473/378 |
| 7,300,364 B2 * | 11/2007 | Boehm ............. A63B 37/0003 473/376 |
| 2006/0234812 A1* | 10/2006 | Ladd .................. A63B 37/0039 473/371 |
| 2013/0172106 A1 | 7/2013 | Shinohara |
| 2013/0172119 A1 | 7/2013 | Shinohara |
| 2013/0172120 A1 | 7/2013 | Shinohara |

FOREIGN PATENT DOCUMENTS

| JP | 2013-138855 A | 7/2013 |
| JP | 2013-138856 A | 7/2013 |
| JP | 2013-138857 A | 7/2013 |

OTHER PUBLICATIONS

Kuraray Mowital/Pioloform Product Brochure; Apr. 2013; pp. 1-43.*

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball showing excellent impact durability. The present invention provides a golf ball comprising a spherical core and at least one cover layer covering the spherical core, wherein the golf ball comprises a reinforcing layer containing a polyvinyl acetal resin on the surface of the spherical core.

17 Claims, 1 Drawing Sheet

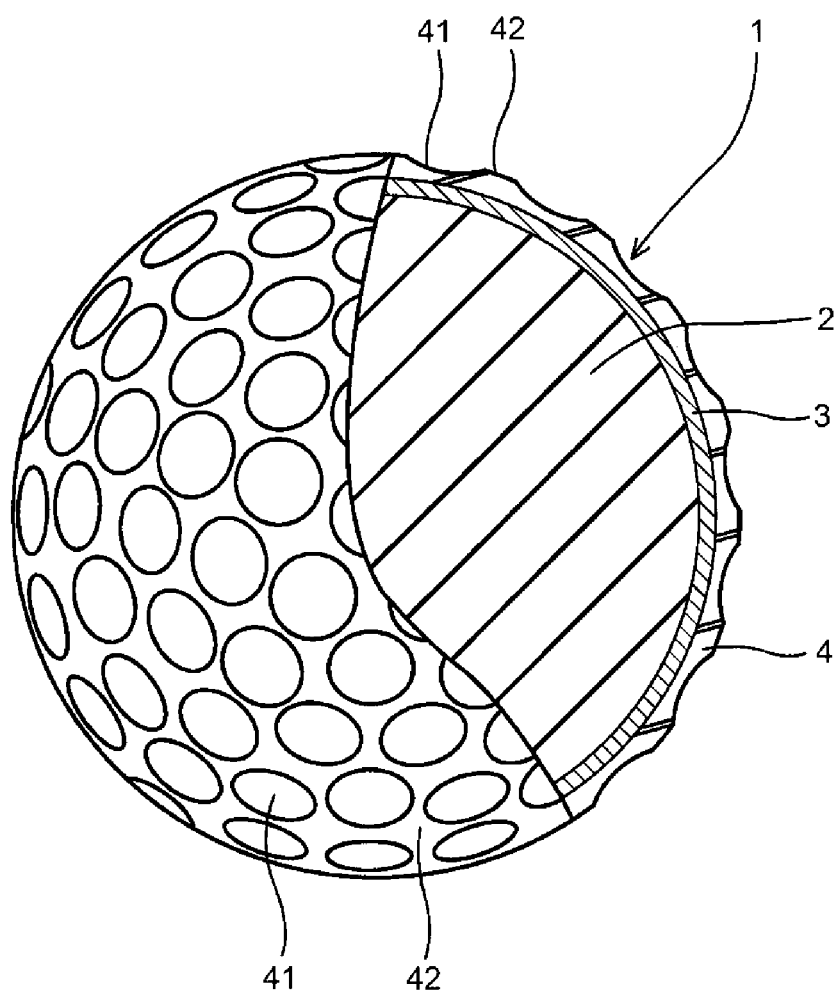

GOLF BALL

FIELD OF THE INVENTION

The present invention relates to a golf ball.

DESCRIPTION OF THE RELATED ART

Usually, a golf ball comprising a spherical core formed from a rubber composition, and a cover covering the spherical core, has been proposed. Generally, the golf ball is used repeatedly. Thus, the golf ball is required to have crack durability against impact. As a method of improving crack durability of the golf ball, a method of blending a rubber powder into the rubber composition constituting the core has been proposed.

For example, Japanese Patent Publication No. 2013-138855 A, No. 2013-138856 A, and No. 2013-138857 A disclose a solid golf ball comprising a core of at least one layer and a cover of at least one layer, wherein at least one layer of the core is formed primarily from polybutadiene and includes at least 0.05 part by mass of (I-a) a rubber powder obtained by granulating a rubber material containing methacrylic acid or a metal salt thereof and/or (I-b) a rubber powder obtained by granulating a rubber material containing acrylic acid or a metal salt thereof, and at least 0.05 part by mass of (II) a polyurethane resin powder per 100 parts by mass of a rubber component thereof, and wherein at least one layer of the cover is formed primarily from polyurethane (refer to claim 1 of No. 2013-138855 A, claim 1 of No. 2013-138856 A, and claim 1 of No. 2013-138857 A).

SUMMARY OF THE INVENTION

An object of the present invention is to provide a golf ball showing excellent impact durability.

The present invention that has achieved the above object provides a golf ball comprising a spherical core and at least one cover layer covering the spherical core, wherein the golf ball comprises a reinforcing layer containing a polyvinyl acetal resin on a surface of the spherical core. If the reinforcing layer is formed on the surface of the spherical core, durability of the surface of the spherical core against the repeated hitting improves.

According to the present invention, a golf ball showing excellent impact durability is obtained.

BRIEF DESCRIPTION OF THE DRAWINGS

FIG. 1 is a partially cutaway view of a golf ball according to one embodiment of the present invention.

DESCRIPTION OF THE PREFERRED EMBODIMENT

The present invention provide a golf ball comprising a spherical core and at least one cover layer covering the spherical core, wherein the golf ball comprises a reinforcing layer containing a polyvinyl acetal resin on a surface of the spherical core. If the reinforcing layer is formed on the surface of the spherical core, durability against the repeated hitting to the spherical core improves.

The polyvinyl acetal resin is a resin obtained by acetalizing a part of hydroxyl groups in the repeating units derived from vinyl alcohol of a polymer which has vinyl alcohol as a constituent component. In other words, the polyvinyl acetal resin is a copolymer comprising a repeating unit represented by the chemical formula (1) and a repeating unit represented by the chemical formula (2).

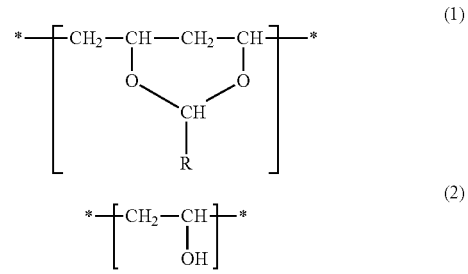

(In the formulae, R represents a hydrogen atom or an alkyl group having 1 to 20 carbon atoms, and * represents a bond.)

Examples of the alkyl group having 1 to 20 carbon atoms include methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group. Among them, the alkyl group having 1 to 10 carbon atoms is preferred, the alkyl group having 2 to 5 carbon atoms is more preferred, and the propyl group is even more preferred.

The ratio of the repeating unit represented by the chemical formula (1) in the polyvinyl acetal resin to the total amount of the repeating units constituting the polyvinyl acetal resin is preferably in a range from 40 mole % to 75 mole %, and more preferably in a range from 45 mole % to 70 mole %. The ratio of the repeating unit represented by the chemical formula (2) in the polyvinyl acetal resin to the total amount of the repeating units constituting the polyvinyl acetal resin is preferably in a range from 20 mole % to 50 mole %, and more preferably in a range from 25 mole % to 45 mole %. The polyvinyl acetal resin may comprise a unit derived from vinyl acetate, a unit derived from ethylene, or the like as a repeating unit. Further, the total ratio of the repeating unit represented by the chemical formula (1) and the repeating unit represented by the chemical formula (2) in the polyvinyl acetal resin to the total amount of the repeating units constituting the polyvinyl acetal resin is preferably 80 mole % or more, and more preferably 90 mole % or more.

The weight average molecular weight of the polyvinyl acetal resin is preferably $1.0 \times 10^4$ or more, more preferably $2.0 \times 10^4$ or more, and even more preferably $2.2 \times 10^4$ or more, and is preferably $1.0 \times 10^5$ or less, more preferably $7.0 \times 10^4$ or less, and even more preferably $6.5 \times 10^4$ or less. If the weight average molecular weight is $1.0 \times 10^4$ or more, the viscosity of the resin solution is suitable, and if the weight average molecular weight is $1.0 \times 10^5$ or less, the mechanical strength of the reinforcing layer increases. It is noted that the weight average molecular weight is measured using gel permeation chromatography (elute: tetrahydrofuran), and the weight average molecular weight is determined based on the polystyrene conversion.

The viscosity of the polyvinyl acetal resin is preferably 5 mPa·s or more, more preferably 10 mPa·s or more, and is preferably 300 mPa·s or less, more preferably 250 mPa·s or less. If the viscosity is 5 mPa·s or more, the viscosity of the resin solution is easily adjusted to a suitable range, and if the viscosity is 300 mPa·s or less, the mechanical strength of the reinforcing layer increases. It is noted that the viscosity is a viscosity of a solution (concentration: 5 mass %) obtained by dissolving the polyvinyl acetal resin in a mixed solvent (volume ratio: 1:1) of ethanol/toluene, and measured by using B type viscometer (measurement temperature: 20° C.).

The degree of acetalization of the polyvinyl acetal resin is preferably 60 mole % or more, more preferably 63 mole % or more, and even more preferably 65 mole % or more, and is preferably 80 mole % or less, more preferably 77 mole % or less, and even more preferably 75 mole % or less. If the degree of acetalization is 60 mole % or more, the flexibility of the reinforcing layer increases, and if the degree of acetalization is 80 mole % or less, the solubility in the nonpolar solvent becomes high. It is noted that the degree of acetalization is a ratio (mole %) of the acetalized hydroxyl groups to the hydroxyl groups derived from the vinyl alcohol unit. In the case that the polyvinyl acetal resin comprises an esterized vinyl alcohol as the constituting unit, the esterized hydroxyl group is also deemed as the hydroxyl group derived from the vinyl alcohol unit.

The amount of the residual hydroxyl group in the polyvinyl acetal resin is preferably 20 mole % or more, more preferably 22 mole % or more, and even more preferably 25 mole % or more, and is preferably 40 mole % or less, more preferably 38 mole % or less, and even more preferably 36 mole % or less. If the amount of the residual hydroxyl group is 20 mole % or more, the mechanical strength of the reinforcing layer increases, and if the amount of the residual hydroxyl group is 40 mole % or less, the solubility in the polar solvent increases. It is noted that the amount of the residual hydroxyl group is a ratio (mole %) of the unacetalized or unesterized hydroxyl groups to the hydroxyl groups derived from the vinyl alcohol unit.

The polyvinyl acetal resin is preferably a copolymer comprising a repeating unit represented by the chemical formula (3) as well as the repeating units represented by the chemical formulae (1) and (2). Such copolymer may be obtained by replacing a part of acid groups of polyvinyl acetate with a hydroxyl group, and then reacting a part of the hydroxyl groups with aldehyde.

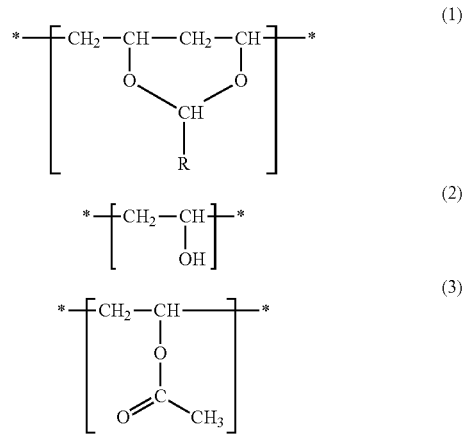

(In the formulae, R represents a hydrogen atom or an alkyl group having 1 to 20 carbon atoms, and * represents a bond.)

When the polyvinyl acetal resin comprises the repeating unit represented by the chemical formula (3), the amount of the residual acetyl group in the polyvinyl acetal resin is preferably 1 mole % or more, more preferably 1.5 mole % or more, and is preferably 5 mole % or less, more preferably 4 mole % or less. If the amount of the residual acetyl group falls within the above range, the viscosity of the resin solution is easily adjusted to a suitable range. It is noted that the amount of the residual acetyl group is a ratio (mole %) of the acid groups that are not substituted with the hydroxyl group to the acid groups of polyvinyl acetate. In the copolymer comprising the repeating units represented by the chemical formulae (1) to (3), the sum of the degree of acetalization, the amount of the residual hydroxyl group, and the amount of the residual acetyl group are 100 mole %.

In the copolymer comprising the repeating units represented by the chemical formulae (1) to (3), the ratio of the repeating unit represented by the chemical formula (1) in the polyvinyl acetal resin to the total amount of the repeating units constituting the polyvinyl acetal resin is preferably in a range from 40 mole % to 75 mole %, and more preferably in a range from 45 mole % to 70 mole %. The ratio of the repeating unit represented by the chemical formula (2) in the polyvinyl acetal resin to the total amount of the repeating units constituting the polyvinyl acetal resin is preferably in a range from 20 mole % to 50 mole %, and more preferably in a range from 25 mole % to 45 mole %. The ratio of the repeating unit represented by the chemical formula (3) in the polyvinyl acetal resin to the total amount of the repeating units constituting the polyvinyl acetal resin is preferably in a range from 1 mole % to 10 mole %, and more preferably in a range from 2 mole % to 7 mole %. The total ratio of the repeating unit represented by the chemical formula (1), the repeating unit represented by the chemical formula (2) and the repeating unit represented by the chemical formula (3) in the polyvinyl acetal resin to the total amount of the repeating units constituting the polyvinyl acetal resin is preferably 90 mole % or more, and more preferably 95 mole % or more. The polyvinyl acetal resin also preferably consists of the repeating units represented by the chemical formulae (1) to (3).

The polyvinyl acetal resin is particularly preferably a polyvinyl butyral resin represented by the chemical formula (4). The polyvinyl butyral resin represented by the chemical formula (4) may be a random copolymer, or a block copolymer.

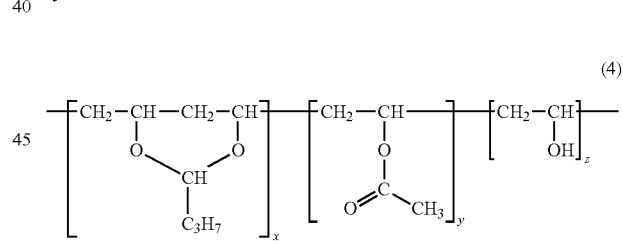

(In the formula (4), x, y and z represent the ratio (mole %) of each of repeating unit, $40 \le x \le 75$, $1 \le y \le 10$, $20 \le z \le 50$, and $x+y+z \ge 90$.)

The above x is more preferably 45 mole % to 70 mole %, y is more preferably 2 mole % to 7 mole %, and z is more preferably 25 mole % to 45 mole %. The above x +y +z is more preferably 95 mole % or more, and particularly preferably 100 mole %.

The reinforcing layer can be formed by applying a melted polyvinyl acetal resin to the surface of the spherical core, or by applying a resin solution containing the polyvinyl acetal resin and a solvent to the surface of the spherical core, followed by removing the solvent. The solvent is not particularly limited as long as it is an organic solvent in which the polyvinyl acetal resin is soluble. Examples of the organic solvent include ketones such as diethyl ketone, methylethyl ketone, and methylisobutyl ketone; esters such as methyl acetate, ethyl acetate, and propyl acetate; alcohols such as ethanol and propyl alcohol; glycol ethers such as propylene glycol monomethyl ether; toluene; and the like.

The concentration of the polyvinyl acetal resin in the resin solution is preferably 0.5 mass % or more, more preferably 1.0 mass % or more, and even more preferably 1.5 mass % or more, and is preferably 20 mass % or less, more preferably 15 mass % or less, and even more preferably 12 mass % or less. If the concentration of the polyvinyl acetal resin is 0.5 mass % or more, the impact resistance of the reinforcing layer further increases, and if the concentration of the polyvinyl acetal resin is 20 mass % or less, the adhesion of the spherical core to the upper layer thereof (e.g. a cover layer) increases.

The method of applying the resin solution is not particularly limited, and the conventional method can be adopted. Examples of the conventional method include spray coating, electrostatic coating, and the like. The application may be conducted one time or multiple times. When applying the resin solution, the applying amount for one time to one spherical core is preferably 40 mg or more, more preferably 50 mg or more, and even more preferably 60 mg or more, and is preferably 200 mg or less, more preferably 170 mg or less, and even more preferably 150 mg or less. If the applying amount is 40 mg or more, the impact resistance of the spherical core further increases, and if the applying amount is 200 mg or less, the adhesion of the spherical core to the upper layer thereof (e.g. a cover layer) increases.

The method of removing the solvent is not particularly limited, and may be conducted by drying for 0.5 hour to 24 hours at a temperature ranging from 23° C. to 40° C.

The amount of the polyvinyl acetal resin per unit area of the reinforcing layer is preferably 0.001 mg/cm$^2$ or more, more preferably 0.005 mg/cm$^2$ or more, and even more preferably 0.01 mg/cm$^2$ or more, and is preferably 1.0 mg/cm$^2$ or less, more preferably 0.9 mg/cm$^2$ or less, and even more preferably 0.8 mg/cm$^2$ or less. If the content of the polyvinyl acetal resin per unit area of the reinforcing layer is 0.001 mg/cm$^2$ or more, the impact resistance of the spherical core further increases, and if the content of the polyvinyl acetal resin per unit area of the reinforcing layer is 1.0 mg/cm$^2$ or less, the adhesion of the spherical core to the upper layer thereof (e.g. a cover layer) increases. It is noted that the area of the reinforcing layer is deemed to be the same as the surface area of the spherical core. In addition, the amount of the polyvinyl acetal resin in the reinforcing layer can be calculated from the mass of the spherical core before and after the reinforcing layer is formed thereon.

The thickness of the reinforcing layer is preferably 1 μm or more, more preferably 3 μm or more, and is preferably 15 μm or less, more preferably 12 μm or less, and even more preferably 10 μm or less. The thickness of the reinforcing layer can be measured by observing the cross section of the golf ball with a microscope.

The reinforcing layer may contain other components than the polyvinyl acetal resin as long as it does not impair the effect of the present invention. Examples of the other components include a dispersant, leveling agent, and thickener. The amount of the other components than the polyvinyl acetal resin in the reinforcing layer is preferably 10 mass % or less, more preferably 5 mass % or less, and even more preferably 3 mass % or less.

The golf ball according to the present invention comprises a spherical core and a cover layer covering the spherical core. The reinforcing layer containing the polyvinyl acetal resin exhibits a larger effect on improving the adhesion between a member formed from a rubber composition and a member formed from a resin composition. Thus, the reinforcing layer is preferably disposed between the member formed from the rubber composition and the member formed from the resin composition. Accordingly, it is preferred for the golf ball that the surface of the spherical core is formed from the rubber composition, and the cover layer adjacent to the spherical core is formed from the resin composition.

The spherical core construction is not particularly limited, and may be a single-layered construction, or a multi-layered construction having two or more layers.

A conventionally known rubber composition (hereinafter simply referred to as "core rubber composition" occasionally) may be employed for the spherical core. Examples of the core rubber composition include a rubber composition containing (a) a base rubber, (b) a co-crosslinking agent, and (c) a crosslinking initiator.

As (a) the base rubber, a natural rubber and/or a synthetic rubber may be used. Examples of (a) the base rubber include a polybutadiene rubber, a natural rubber, a polyisoprene rubber, a styrene polybutadiene rubber, and an ethylene-propylene-diene rubber (EPDM). These rubbers may be used solely, or two or more of them may be used in combination. Among them, particularly preferred is a high cis-polybutadiene having cis-1,4-bond in a content of 40 mass % or more, more preferably 80 mass % or more, and even more preferably 90 mass % or more in view of its advantageous resilience.

The high cis-polybutadiene preferably has 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high cis-polybutadiene preferably includes a product synthesized by using a rare-earth element catalyst. When a neodymium catalyst employing a neodymium compound which is a lanthanum series rare-earth element compound, is used, a polybutadiene rubber having a high content of cis-1,4 bond and a low content of 1,2-vinyl bond can be obtained with excellent polymerization activity, thus such a polybutadiene rubber is particularly preferred.

(b) The co-crosslinking agent has an action of crosslinking a rubber molecule by graft polymerization to a base rubber molecular chain. As (b) the co-crosslinking agent, for example, an α,β-unsaturated carboxylic acid having 3 to 8 carbon atoms and/or a metal salt thereof is preferable. The α,β-unsaturated carboxylic acid used as (b) the co-crosslinking agent preferably has 3 to 8 carbon atoms, more preferably has 3 to 6 carbon atoms, and even more preferably has 3 or 4 carbon atoms. Examples of the α,β-unsaturated carboxylic acid having 3 to 8 carbon atoms include acrylic acid, methacrylic acid, fumaric acid, maleic acid, and crotonic acid.

As the metal constituting the metal salt of the α,β-unsaturated carboxylic acid having 3 to 8 carbon atoms, a monovalent metal ion such as sodium, potassium, lithium; a divalent metal ion such as magnesium, calcium, zinc, barium, cadmium; a trivalent metal ion such as aluminum; or other ion such as tin, zirconium, can be used. These metal components may be used solely or as a mixture of two or more of them. Among them, as the metal component, the divalent metal such as magnesium, calcium, zinc, barium, or cadmium is preferred. Use of the divalent metal salt of the α,β-unsaturated carboxylic acid having 3 to 8 carbon atoms easily generates a metal crosslinking between the rubber molecules. Especially, in view of the enhanced resilience of the resultant golf ball, as the divalent metal salt, the zinc salt of the α,β-unsaturated carboxylic acid having 3 to 8 carbon atoms is preferable, and zinc acrylate is more preferable. In addition, the α,β-unsaturated carboxylic acid having 3 to 8 carbon atoms and/or the metal salt thereof may be used solely or used by combining two or more of them.

The amount of (b) the co-crosslinking agent is preferably 15 parts by mass or more, more preferably 20 parts by mass or more, and is preferably 50 parts by mass or less, more preferably 45 parts by mass or less, even more preferably 40 parts by mass or less, with respect to 100 parts by mass of (a) the base rubber. If the amount of (b) the co-crosslinking agent is less than 15 parts by mass, the amount of (c) the crosslinking initiator which will be explained below must be increased such that the constituting member formed from the core rubber composition has an appropriate hardness, which tends to cause lowered resilience of the resultant golf ball. On the other hand, if the amount of (b) the co-crosslinking agent exceeds 50 parts by mass, the constituting member formed from the core rubber composition becomes excessively hard, which tends to cause lowered shot feeling of the resultant golf ball.

(c) The crosslinking initiator is blended to crosslink (a) the base rubber component. As (c) the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxide may be used solely, or used by combining two or more of them. Among them, dicumyl peroxide is preferably used.

The amount of (c) the crosslinking initiator is preferably 0.2 part by mass or more, more preferably 0.5 part by mass or more, and is preferably 5.0 parts by mass or less, more preferably 2.5 parts by mass or less, with respect to 100 parts by mass of (a) the base rubber. If the amount of (c) the crosslinking initiator is less than 0.2 part by mass, the constituting member formed from the core rubber composition becomes excessively soft, which tends to cause lowered resilience of the resultant golf ball. On the other hand, if the amount of (c) the crosslinking initiator exceeds 5.0 parts by mass, the amount of (b) the co-crosslinking agent which has been explained above must be decreased such that the constituting member formed from the core rubber composition has an appropriate hardness, which tends to cause insufficient resilience or lowered durability of the resultant golf ball.

When the α,β-unsaturated carboxylic acid having 3 to 8 carbon atoms is used as (b) the co-crosslinking agent, the core rubber composition may contain (d) a metal compound.

(d) The metal compound is not particularly limited as long as it can neutralize (b) the α,β-unsaturated carboxylic acid having 3 to 8 carbon atoms in the rubber composition. Examples of (d) the metal compound include a metal hydroxide such as magnesium hydroxide, zinc hydroxide, calcium hydroxide, sodium hydroxide, lithium hydroxide, potassium hydroxide, copper hydroxide; a metal oxide such as magnesium oxide, calcium oxide, zinc oxide, copper oxide; and a metal carbonate such as magnesium carbonate, zinc carbonate, calcium carbonate, sodium carbonate, lithium carbonate, potassium carbonate. As (d) the metal compound, the divalent metal compound is preferable, and the zinc compound is more preferable. This is because the divalent metal compound reacts with the α,β-unsaturated carboxylic acid having 3 to 8 carbon atoms to form a metal crosslinking. Use of the zinc compound provides a golf ball with high resilience. (d) The metal compounds may be used solely, or two or more of them may be used in combination.

The core rubber composition may contain (e) a carboxylic acid and/or a salt thereof. If (e) the carboxylic acid and/or the salt thereof is contained, the resultant spherical core exhibits a higher degree of the outer-hard and inner soft structure. Examples of (e) the carboxylic acid and/or the salt thereof include an aliphatic carboxylic acid, an aliphatic carboxylic acid salt, an aromatic carboxylic acid, and an aromatic carboxylic acid salt. (e) The carboxylic acid and/or the salt thereof may be used solely or as a mixture of two or more of them. It is noted that (e) the carboxylic acid and/or the salt does not include the α,β-unsaturated carboxylic acid having 3 to 8 carbon atoms and/or the metal salt thereof which is used as (b) the co-crosslinking agent.

As (e) the aliphatic carboxylic acid and/or the salt thereof, a saturated fatty acid and/or a salt thereof is preferable. Caprylic acid (octanoic acid), pelargonic acid (nonanoic acid), capric acid (decanoic acid), lauric acid, myristic acid, palmitic acid, stearic acid, behenic acid, oleic acid, or their potassium salt, magnesium salt, calcium salt, aluminum salt, zinc salt, iron salt, copper salt, nickel salt, and cobalt salt are preferable. As (e) the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, anthracene carboxylic acid, furan carboxylic acid, thenoic acid, or their potassium salt, magnesium salt, calcium salt, aluminum salt, zinc salt, iron salt, copper salt, nickel salt, and cobalt salt are particularly preferable.

The amount of (e) the carboxylic acid and/or the salt thereof, for example, is preferably 0.5 part by mass or more, more preferably 1.0 part by mass or more, even more preferably 1.5 parts by mass or more, and is preferably 40 parts by mass or less, more preferably 35 parts by mass or less, even more preferably 30 parts by mass or less, with respect to 100 parts by mass of (a) the base rubber. If the amount of (e) the carboxylic acid and/or the salt thereof is 0.5 part by mass or more, the spherical core has a higher degree of the outer-hard inner-soft structure, and if the amount of (e) the carboxylic acid and/or the salt thereof is 40 parts by mass or less, the resilience of the core becomes better since the hardness decrease of the core may be suppressed.

The core rubber composition preferably further contains (f) an organic sulfur compound. By containing (f) the organic sulfur compound, the obtained spherical core has better resilience. Examples of (f) the organic sulfur compound include thiophenols, thionaphthols, polysulfides, thiurams, thiocarboxylic acids, dithiocarboxylic acids, sulfenamides, dithiocarbamates, and thiazoles. In light of increasing the hardness distribution of the spherical core, (f) the organic sulfur compound preferably includes an organic compound having a thiol group (—SH) or a metal salt thereof, and thiophenols, thionaphthols or their metal salts are preferable. (f) The organic sulfur compounds can be used solely or as a mixture of at least two of them.

As (f) the organic sulfur compound, the thiophenols and/or the metal salts thereof, the thionaphthols and/or the metal salts thereof, diphenyldisulfides, and thiuramdisulfides are preferable. 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, pentabromothiophenol, 1-thionaphthol, 2-thionaphthol, diphenyldisulfide, bis(2,6-difluorophenyl)

disulfide, bis(2,6-dichlorophenyl)disulfide, bis(2,6-dibromophenyl)disulfide, bis(2,6-diiodophenyl)disulfide, and bis(pentabromophenyl)disulfide are more preferable.

The amount of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (f) the organic sulfur compound is 0.05 part by mass or more, the resilience of the resultant golf ball further increases. If the amount of (f) the organic sulfur compound is 5.0 parts by mass or less, the compression deformation amount of the obtained golf ball does not become excessively large, thus the decrease in resilience may be suppressed.

A weight adjusting agent such as zinc oxide or barium sulfate, an antioxidant, a pigment or the like can be appropriately blended in the core rubber composition as well as the base rubber, the co-crosslinking agent and the crosslinking initiator. The spherical core can be obtained by molding the rubber composition in a mold. The temperature for molding the spherical core is preferably 120° C. or more, more preferably 140° C. or more, even more preferably 150° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

The diameter of the spherical core is preferably 34.8 mm or more, more preferably 36.8 mm or more, and even more preferably 38.8 mm or more, and is preferably 42.2 mm or less, more preferably 41.8 mm or less, even more preferably 41.2 mm or less, and mostly preferably 40.8 mm or less. If the diameter of the spherical core is 34.8 mm or more, the cover does not become excessively thick, thus the resilience of the golf ball further increases. On the other hand, if the diameter of the spherical core is 42.2 mm or less, the cover does not become excessively thin, thus the cover functions better.

When the spherical core has a diameter ranging from 34.8 mm to 42.2 mm, the compression deformation amount (shrinking amount of the spherical core in the compression direction thereof) of the spherical core when applying a load from an initial load of 98 N to a final load of 1275 N to the spherical core is preferably 2.0 mm or more, more preferably 2.8 mm or more, and is preferably 6.0 mm or less, more preferably 5.0 mm or less. If the compression deformation amount is 2.0 mm or more, the shot feeling becomes better. Further, if the compression deformation amount is 6.0 mm or less, the resilience becomes better.

The golf ball according to the present invention comprises at least one cover layer covering the spherical core. The cover may be a single-layered construction, or a multi-layered construction having two or more layers, as long as it is a construction having at least one layer.

The cover can be formed from a cover composition containing a resin component. Examples of the resin component include an ionomer resin; a thermoplastic polyurethane elastomer with a trade name of "Elastollan (registered trademark)" commercially available from BASF Japan Ltd; a thermoplastic polyamide elastomer with a trade name of "Pebax (registered trademark)" commercially available from Arkema K. K.; a thermoplastic polyester elastomer with a trade name of "Hytrel (registered trademark)" commercially available from Du Pont-Toray Co., Ltd.; and a thermoplastic styrene elastomer with a trade name of "Rabalon (registered trademark)" commercially available from Mitsubishi Chemical Corporation; and an ethylene-methacrylic acid copolymer with a trade name of "Nucrel (registered trademark)" commercially available from E. I. du Pont de Nemours and Company.

The resin component used in the cover composition preferably includes a resin having a functional group reactive with the hydroxyl group. If such a resin is used, the resin can crosslink with the hydroxyl group of the polyvinyl acetal resin, the adhesion between the spherical core and the cover is enhanced, thus the durability of the resultant golf ball is enhanced. Examples of the resin having the functional group reactive with the hydroxyl group include an ionomer resin.

Examples of the ionomer resin include a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion; and a mixture of them. The olefin preferably includes an olefin having 2 to 8 carbon atoms. Examples of the olefin include ethylene, propylene, butene, pentene, hexene, heptene, and octene. The olefin particularly preferably includes ethylene. Examples of the α,β-unsaturated carboxylic acid having 3 to 8 carbon atoms include acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid, and the like. In particular, acrylic acid ester and methacrylic acid ester are preferable. Among these, the ionomer resin preferably includes the metal ion-neutralized product of the ethylene-(meth) acrylic acid binary copolymer, and the metal ion-neutralized product of the ethylene-(meth) acrylic acid-(meth) acrylic acid ester ternary copolymer.

The amount of the α,β-unsaturated carboxylic acid component having 3 to 8 carbon atoms in the ionomer resin is preferably 2 mass % or more, more preferably 3 mass % or more, and is preferably 30 mass % or less, more preferably 25 mass % or less. In addition, the neutralization degree of the carboxyl groups of the ionomer resin is preferably 20 mole % or more, more preferably 30 mole % or more, and is preferably 90 mole % or less, more preferably 85 mole % or less. It is noted that the neutralization degree means a ratio (mole %) of the number of the neutralized carboxyl groups to the total number of the carboxyl groups in the ionomer resin.

The cover composition preferably contains the ionomer resin as the resin component. The amount of the ionomer resin in the resin component of the cover composition is preferably 50 mass % or more, more preferably 60 mass % or more, and even more preferably 70 mass % or less.

In addition to the above resin component, the cover composition may further contain a pigment component such as a white pigment (for example, titanium oxide), a blue pigment, and a red pigment; a weight adjusting agent such as calcium carbonate, and barium sulfate; a dispersant; an antioxidant; an ultraviolet absorber; a light stabilizer (for example, a hindered amine light stabilizer); a fluorescent material or a fluorescent brightener; and the like, as long as they do not impair the performance of the cover.

Examples of the method for molding the cover of the golf ball according to the present invention include: a method which comprises molding the cover composition into a hollow shell, covering the core with a plurality of the shells, and performing compression molding (preferably a method which comprises molding the cover composition into a hollow half shell, covering the core with two of the half shells, and performing compression molding); and a method which comprises injection molding the cover composition directly onto the core.

When molding the cover in the compression molding method, molding of the half shell can be performed by either compression molding method or injection molding method, and the compression molding method is preferred.

Compression molding the cover composition into the half shell can be carried out, for example, under a pressure in a range from 1 MPa to 20 MPa and at a molding temperature of −20° C. or more and 70° C. or less relative to the flow beginning temperature of the cover composition. By performing the molding under the above conditions, a half shell having a uniform thickness can be formed. Examples of the method for molding the cover using half shells include a method which comprises covering the core with two half shells, and performing compression molding. Compression molding the half shells into the cover can be carried out, for example, under a molding pressure in a range from 0.5 MPa to 25 MPa and at a molding temperature of −20° C. or more and 70° C. or less relative to the flow beginning temperature of the cover composition. By performing the molding under the above conditions, the cover having a uniform thickness can be formed.

When injection molding the cover composition into the cover, the cover composition extruded into a pellet form may be used for injection molding, or the cover materials such as the base resin component, pigment and the like may be dry-blended and directly used for injection molding. As the upper and lower molds for forming the cover, upper and lower molds having a hemispherical cavity and pimples wherein a part of the pimple also serves as a retractable hold pin, are preferably used. Injection molding of the cover can be carried out by protruding the hold pin to hold the core, charging the cover composition, and then cooling to obtain the cover. For example, injection molding of the cover can be carried out by charging the cover composition heated to the temperature of 200° C. to 250° C. into a mold held under the pressure of 9 MPa to 15 MPa for 0.5 second to 5 seconds, cooling for 10 seconds to 60 seconds, and opening the mold. In addition, in the case of injection molding, the temperature of the cover composition injected on the reinforcing layer is preferably equal to or higher than the softening point of the polyvinyl acetal resin forming the reinforcing layer. This is because the reinforcing layer becomes a softened state when molding the cover, the adhesion strength between the core surface and the cover further increases.

The concave called dimple is usually formed on the surface of the outermost layer of the cover. The total number of dimples is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of dimples includes, without limitation, a circle; a polygonal shape such as a roughly triangular shape, a roughly quadrangular shape, a roughly pentagonal shape, a roughly hexagonal shape; or other irregular shape. The shape of dimples is employed solely or in combination of at least two of them.

The thickness of the cover is preferably 4.0 mm or less, more preferably 3.0 mm or less, and even more preferably 2.0 mm or less. If the thickness of the cover is 4.0 mm or less, the obtained golf ball exhibits better resilience and shot feeling. The thickness of the cover is preferably 0.3 mm or more, more preferably 0.5 mm or more, even more preferably 0.8 mm or more, and particularly preferably 1.0 mm or more. If the thickness of the cover is less than 0.3 mm, the durability and wear resistance of the cover may deteriorate. When the cover comprises multiple layers, the total thickness of the multiple cover layers preferably falls within the above range.

After the cover is molded, the obtained golf ball body is ejected from the mold, and is preferably subjected to surface treatments such as deburring, cleaning and sandblast where necessary. If desired, a paint film or a mark may be formed. The paint film preferably has a thickness of, but not limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to continued use of the golf ball, and if the thickness of the paint film is more than 50 μm, the dimple effect is reduced, resulting in lowering flying performance of the golf ball.

The golf ball preferably has a diameter ranging from 40 mm to 45 mm. In light of satisfying the regulation of US Golf Association (USGA), the diameter is most preferably 42.67 mm or more. In light of prevention of air resistance, the diameter is preferably 44 mm or less, and more preferably 42.80 mm or less. The golf ball preferably has a mass of 40 g or more and 50 g or less. In light of obtaining greater inertia, the mass is preferably 44 g or more, and more preferably 45 g or more. In light of satisfying the regulation of USGA, the mass is preferably 45.93 g or less.

When the golf ball according to the present invention has a diameter in a range from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.4 mm or more, even more preferably 2.5 mm or more, and most preferably 2.8 mm or more, and is preferably 5.0 mm or less, more preferably 4.5 mm or less. If the compression deformation amount is 2.0 mm or more, the golf ball does not become excessively hard, so the shot feeling thereof becomes better. On the other hand, if the compression deformation amount is 5.0 mm or less, the resilience of the golf ball becomes better.

Examples of the golf ball body construction include: a two-piece golf ball comprising a single-layered spherical core, and a cover covering the spherical core; a three-piece golf ball comprising a dual-layered spherical core, and a cover covering the spherical core; a three-piece golf ball comprising a single-layered spherical core, an inner cover covering the spherical core, and an outer cover covering the inner cover; a four-piece golf ball comprising a dual-layered spherical core, an inner cover covering the spherical core, and an outer cover covering the inner cover; and the like.

FIG. 1 is a partially cutaway view of a golf ball 1 according to one embodiment of the present invention. The golf ball 1 comprises a spherical core 2, and a cover 4 disposed around the outer side of the spherical core 2. A reinforcing layer 3 is formed on the surface of the spherical core 2. A plurality of dimples 41 are formed on the surface of the cover 4. Other portions than dimples 41 on the surface of the cover 4 are land 42.

EXAMPLES

Hereinafter, the present invention will be described in detail by way of examples. The present invention is not limited to the examples described below. Various changes and modifications can be made without departing from the spirit and scope of the present invention.

[Evaluation Method]

Durability

Ten specimen for each spherical core or golf ball were used. The spherical core or golf ball was allowed to collide with a metal plate at a speed of 50 m/sec by using an air gun, the collision number required to break the spherical core or golf ball was counted, and the average value of ten specimen was calculated. The collision number for Golf ball No. 30 was defined as an index of 100, and the durability of each spherical core or golf ball was represented by converting the collision number for each spherical core or golf ball into this index.

[Production of Golf Balls]

(1) Production of Core

The rubber composition having the formulation shown in Table 1 was kneaded and heat-pressed in upper and lower molds, each having a hemispherical cavity, at 170° C. for 20 minutes to obtain the spherical core (diameter of the core for Golf balls No. 1 to No. 26, and No. 30: 39.9 mm; diameter of the core for Golf balls No. 27 to No. 29: 39.2 mm).

TABLE 1

| | Core | |
|---|---|---|
| Formulation (parts by mass) | Polybutadiene rubber | 100 |
| | Zinc acrylate | 27 |
| | Barium sulfate | Appropriate amount |
| | Zinc oxide | 3 |
| | Dicumyl peroxide | 0.7 |

Polybutadiene rubber: "BR-730 (high-cis polybutadiene (cis-1,4 bond content=96 mass %, 1,2-vinyl bond content=1.3 mass %, Moony viscosity ($ML_{1+4}$ (100° C.))=55, molecular weight distribution (Mw/Mn)=3))" manufactured by JSR Corporation Zinc acrylate: "Sanceler (registered trademark) SR" manufactured by Sanshin Chemical Industry Co., Ltd.

Barium sulfate: "Barium Sulfate BD" manufactured by Sakai Chemical Industry Co., Ltd.

Zinc oxide: "Ginrei (registered trademark) R" manufactured by Toho Zinc Co., Ltd.

Dicumyl peroxide: "Percumyl (registered trademark) D" manufactured by NOF Corporation (2) Production of Reinforcing Layer According to the formulations shown in Tables 4, 5, the polyvinyl acetal resin and the solvent were mixed to prepare the resin solution. The resin solution was applied, by using a spray gun, to the surface of the spherical core obtained above, and then dried at 23° C. for at least 30 minutes to form the reinforcing layer. Application of the resin solution was conducted as follows. The spherical core was placed on a rotating member provided with prongs, and the rotating member was rotated at 300 rpm. Application of the resin solution was conducted by spacing a spray distance (7 cm) between the spray gun and the spherical core while moving the spray gun in an up and down direction.

(3) Production of Cover

Golf Balls No. 1 to No. 26, and No. 30

The outer cover materials having the formulation shown in Table 3 were extruded with a twin-screw kneading extruder to prepare the outer cover composition in a pellet form. Extrusion was performed in the following conditions: screw diameter: 45 mm, screw revolutions: 200 rpm, and screw L/D=35. The blended materials were heated to the temperature in a range from 150° C. to 230° C. at the die position of the extruder. The obtained outer cover composition was injection molded on the reinforcing layer obtained above to form the cover (thickness: 1.4 mm). The temperature of the cover composition injected on the reinforcing layer was set to be equal to or higher than the softening point of the polyvinyl acetal resin forming the reinforcing layer.

Golf Balls No. 27 to No. 29

The cover materials having the formulation shown in Tables 2, 3 were extruded with a twin-screw kneading extruder to prepare the cover composition in a pellet form. Extrusion was performed in the following conditions: screw diameter: 45 mm, screw revolutions: 200 rpm, and screw L/D=35. The blended materials were heated to the temperature in a range from 150° C. to 230° C. at the die position of the extruder. The obtained inner cover composition was injection molded on the reinforcing layer obtained above to form the inner cover (thickness: 1.0 mm). The temperature of the inner cover composition injected on the reinforcing layer was set to be equal to or higher than the softening point of the polyvinyl acetal resin forming the reinforcing layer. Then, the obtained outer cover composition was injection molded on the inner cover to form the outer cover (thickness: 0.8 mm).

TABLE 2

| | Inner cover | |
|---|---|---|
| Formulation (parts by mass) | Surlyn 8945 | 34 |
| | Himilan AM7329 | 40 |
| | Rabalon T3221C | 24 |
| | Tungsten | 22 |

TABLE 3

| | Outer cover | |
|---|---|---|
| Formulation (parts by mass) | Surlyn 8945 | 25 |
| | Himilan AM7329 | 50 |
| | Nucrel 1050H | 25 |
| | Ultramarine blue | 0.04 |
| | Titanium oxide | 3 |

The raw materials used in Tables 2, 3 are shown below.

Surlyn 8945: Sodium ion-neutralized ethylene-methacrylic acid copolymer ionomer resin manufactured by E.I. du Pont de Nemours and Company Himilan AM7329: Zinc ion-neutralized ethylene-methacrylic acid copolymer ionomer resin manufactured by Du Pont-Mitsui Polychemicals Co., Ltd.

Rabalon T3221C: Styrene-based elastomer manufactured by Mitsubishi Chemical Corporation Nucrel 1050H: Ethylene-methacrylic acid copolymer manufactured by Du Pont-Mitsui Polychemicals Co., Ltd.

The durability evaluation results for each of golf ball were shown in Tables 4, 5.

TABLE 4

| | | | Golf ball No. | | | | | | |
|---|---|---|---|---|---|---|---|---|---|
| | | | 1 | 2 | 3 | 4 | 5 | 6 | 7 |
| Resin solution | Formulation (mass %) | Solvent | 99.5 | 97 | 97 | 97 | 97 | 97 | 95 |
| | | BL-S | 0.5 | 3 | 3 | 3 | 3 | 3 | 5 |
| | | BL-5 | — | — | — | — | — | — | — |
| | | BM-S | — | — | — | — | — | — | — |
| Applied amount of resin solution (mg) | | | 100 | 30 | 50 | 100 | 150 | 170 | 30 |
| Resin amount per unit area (mg/cm$^2$) | | | 0.010 | 0.018 | 0.030 | 0.060 | 0.090 | 0.102 | 0.030 |
| Evaluation | Durability of core (index) | | 101 | 150 | 145 | 125 | 115 | 105 | 145 |
| | Durability of golf ball (index) | | 103 | 155 | 150 | 130 | 120 | 110 | 150 |

| | | | Golf ball No. | | | | | |
|---|---|---|---|---|---|---|---|---|
| | | | 8 | 9 | 10 | 11 | 12 | 13 |
| Resin solution | Formulation (mass %) | Solvent | 95 | 95 | 95 | 95 | 90 | 85 |
| | | BL-S | 5 | 5 | 5 | 5 | 10 | 15 |
| | | BL-5 | — | — | — | — | — | — |
| | | BM-S | — | — | — | — | — | — |
| Applied amount of resin solution (mg) | | | 50 | 100 | 150 | 170 | 50 | 50 |
| Resin amount per unit area (mg/cm$^2$) | | | 0.050 | 0.100 | 0.150 | 0.170 | 0.100 | 0.150 |
| Evaluation | Durability of core (index) | | 125 | 105 | 102 | 101 | 105 | 101 |
| | Durability of golf ball (index) | | 130 | 110 | 105 | 103 | 110 | 105 |

TABLE 5

| | | | Golf ball No. | | | | | | | | |
|---|---|---|---|---|---|---|---|---|---|---|---|
| | | | 14 | 15 | 16 | 17 | 18 | 19 | 20 | 21 | 22 |
| Resin solution | Formulation (mass %) | Solvent | 99.5 | 97 | 97 | 95 | 95 | 90 | 90 | 99.5 | 97 |
| | | BL-S | — | — | — | — | — | — | — | — | — |
| | | BL-5 | 0.5 | 3 | 3 | 5 | 5 | 10 | 10 | — | — |
| | | BM-S | — | — | — | — | — | — | — | 0.5 | 3 |
| Applied amount of resin solution (mg) | | | 100 | 50 | 100 | 50 | 100 | 50 | 100 | 50 | 50 |
| Resin amount per unit area (mg/cm$^2$) | | | 0.010 | 0.030 | 0.060 | 0.050 | 0.100 | 0.100 | 0.200 | 0.005 | 0.030 |
| Evaluation | Durability of core (index) | | 101 | 145 | 125 | 125 | 105 | 105 | 101 | 101 | 145 |
| | Durability of golf ball (index) | | 103 | 150 | 130 | 130 | 110 | 110 | 103 | 103 | 150 |

| | | | Golf ball No. | | | | | | | |
|---|---|---|---|---|---|---|---|---|---|---|
| | | | 23 | 24 | 25 | 26 | 27 | 28 | 29 | 30 |
| Resin solution | Formulation (mass %) | Solvent | 97 | 95 | 95 | 90 | 97 | 97 | 97 | — |
| | | BL-S | — | — | — | — | 3 | — | — | — |
| | | BL-5 | — | — | — | — | — | 3 | — | — |
| | | BM-S | 3 | 5 | 5 | 10 | — | — | 3 | — |
| Applied amount of resin solution (mg) | | | 100 | 50 | 100 | 50 | 30 | 50 | 50 | — |
| Resin amount per unit area (mg/cm$^2$) | | | 0.060 | 0.050 | 0.100 | 0.100 | 0.019 | 0.031 | 0.031 | — |
| Evaluation | Durability of core (index) | | 125 | 125 | 105 | 105 | 145 | 130 | 130 | 100 |
| | Durability of golf ball (index) | | 130 | 130 | 110 | 110 | 150 | 135 | 135 | 100 |

The raw materials used in Tables 4, 5 are shown below.

Solvent: "Polyn (registered trademark) #800 thinner" (methyl isobutyl ketone: 35 to 40 mass %, ethyl acetate: 30 to 35 mass %, toluene: 30 to 35 mass %) manufactured by Shinto Paint Co., Ltd.

BL-S: "S-LEC (registered trademark) BL-S" (weight average molecular weight: $2.3 \times 10^4$, degree of butyralization: 71 to 77 mole %, amount of residual hydroxyl group: 18 to 26 mole %, amount of residual acetyl group: 3 to 5 mole %, viscosity: 10 to 30 mPa·s) manufactured by Sekisui Chemical Co., Ltd.

BL-5: "S-LEC BL-5" (weight average molecular weight: $3.2 \times 10^4$, degree of butyralization: 77 mole % or more, amount of residual hydroxyl group: 23 mole % or less, amount of residual acetyl group: 3 mole % or less, viscosity: 30 to 50 mPa·s) manufactured by Sekisui Chemical Co., Ltd.

BM-S: "S-LEC BM-S" (weight average molecular weight: $5.3 \times 10^4$, degree of butyralization: 70 to 76 mole %, amount of residual hydroxyl group: 18 to 26 mole %, amount of residual acetyl group: 4 to 6 mole %, viscosity: 80 to 150 mPa·s) manufactured by Sekisui Chemical Co., Ltd.

Each of the above BL-S, BL-5, and BM-S is the polyvinyl butyral resin represented by the formula (4) in which x+y+z=100.

Golf balls No. 1 to No. 29 are the cases where a reinforcing layer containing a polyvinyl acetal resin is formed on a surface of a spherical core. The spherical cores of these golf balls exhibit better crack durability than the spherical core of Golf ball No. 30 which does not comprise the reinforcing layer. In addition, Golf balls No. 1 to No. 29 which comprise a cover around the reinforcing layer also exhibit excellent durability. Based on these results, it is considered that the reinforcing layer improves the adhesion between the spherical core surface and the cover.

This application is based on Japanese Patent Applications No. 2014-177081 filed on Sep. 1, 2014, the content of which is hereby incorporated by reference.

The invention claimed is:

1. A golf ball comprising a spherical core, a reinforcing layer disposed on the spherical core surface, and at least one cover layer covering the spherical core and reinforcing layer, wherein the reinforcing layer contains a polyvinyl acetal resin and has a thickness ranging from 1 μm to 15 μm.

2. The golf ball according to claim 1, wherein the polyvinyl acetal resin has a viscosity ranging from 5 mPa·s to 300 mPa·s.

3. The golf ball according to claim 1, wherein the polyvinyl acetal resin has a degree of acetalization of 60 mole % or more.

4. The golf ball according to claim 1, wherein the polyvinyl acetal resin has a residual hydroxyl group in an amount of 40 mole % or less.

5. The golf ball according to claim 1, wherein the reinforcing layer is formed by applying a resin solution containing the polyvinyl acetal resin and a solvent to the surface of the spherical core, followed by removing the solvent, and wherein the resin solution contains the polyvinyl acetal resin in a concentration ranging from 0.5 mass % to 20 mass %.

6. The golf ball according to claim 1, wherein an amount of the polyvinyl acetal resin per unit area of the reinforcing layer is in a range from 0.001 mg/cm² to 1.0 mg/cm².

7. The golf ball according to claim 1, wherein the polyvinyl acetal resin comprises repeating units represented by the following formulae (1) to (3):

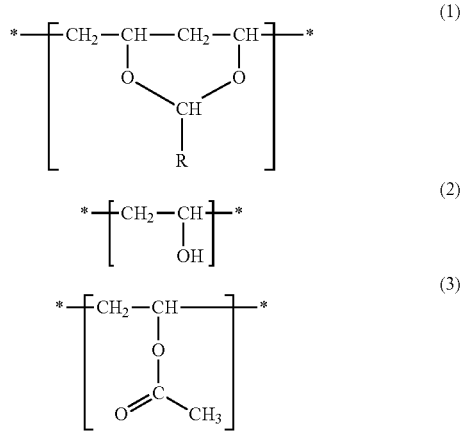

wherein, R represents a hydrogen atom or an alkyl group having 1 to 20 carbon atoms, and * represents a bond.

8. The golf ball according to claim 7, wherein a ratio of the repeating unit represented by the formula (1) to a total amount of repeating units constituting the polyvinyl acetal resin is in a range from 40 mole % to 75 mole %, a ratio of the repeating unit represented by the formula (2) to the total amount of repeating units constituting the polyvinyl acetal resin is in a range from 20 mole % to 50 mole %, a ratio of the repeating unit represented by the formula (3) to the total amount of repeating units constituting the polyvinyl acetal resin is in a range from 1 mole % to 10 mole %, and a total ratio of the repeating units represented by the formulae (1) to (3) to the total amount of repeating units constituting the polyvinyl acetal resin is 90 mole % or more.

9. The golf ball according to claim 7, wherein the polyvinyl acetal resin has a residual acetyl group in an amount ranging from 1 mole % to 5 mole %.

10. The golf ball according to claim 1, wherein the polyvinyl acetal resin comprises repeating units represented by the following formulae (1) to (2):

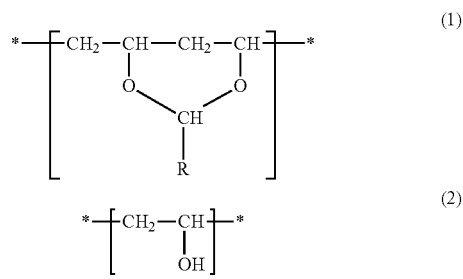

wherein, R represents a hydrogen atom or an alkyl group having 1 to 20 carbon atoms, and * represents a bond.

11. The golf ball according to claim 10, wherein a ratio of the repeating unit represented by the formula (1) to a total amount of repeating units constituting the polyvinyl acetal resin is in a range from 40 mole % to 75 mole %, a ratio of the repeating unit represented by the formula (2) to the total amount of repeating units constituting the polyvinyl acetal resin is in a range from 20 mole % to 50 mole %, and a total ratio of the repeating units represented by the formulae (1) and (2) to the total amount of repeating units constituting the polyvinyl acetal resin is 80 mole % or more.

12. The golf ball according to claim 1, wherein the polyvinyl acetal resin is a polyvinyl butyral resin represented by the following chemical formula (4):

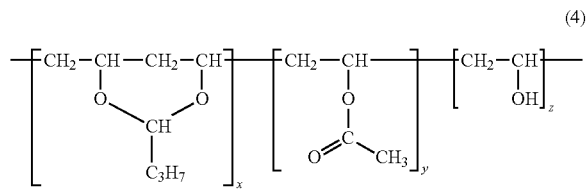

in the formula (4), x, y and z represent a ratio (mole %) of each repeating unit, $40 \leq x \leq 75$, $1 \leq y \leq 10$, $20 \leq z \leq 50$, and $x+y+z \geq 90$.

13. The golf ball according to claim 1, wherein the polyvinyl acetal resin has a weight average molecular weight ranging from $1.0 \times 10^4$ to $1.0 \times 10^5$.

14. The golf ball according to claim 3, wherein the degree of acetalization of the polyvinyl acetal resin is 80 mole % or less.

15. The golf ball according to claim 4 wherein the amount of the residual hydroxyl group in the polyvinyl acetal resin is 20 mole % or more.

16. The golf ball according to claim 1, wherein the surface of the spherical core is formed from a rubber composition, and the cover layer is formed from a resin composition.

17. The golf ball according to claim 16, wherein the rubber composition contains a base rubber, a co-crosslinking agent, and a crosslinking initiator; and the resin composition contains an ionomer resin as a resin component.

* * * * *